(12) United States Patent
Gravino et al.

(10) Patent No.: US 8,954,088 B1
(45) Date of Patent: Feb. 10, 2015

(54) LOCATION-BASED PERSON AND OBJECT MONITORING

(75) Inventors: Douglas David Gravino, Roswell, GA (US); Radhakrishnan Gopinath, Alpharetta, GA (US); Michael L. Poffenberger, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 13/332,690

(22) Filed: Dec. 21, 2011

Related U.S. Application Data (60) Provisional application No. 61/427,052, filed on Dec. 23, 2010.

(51) Int. Cl.
*H04W 24/00* (2009.01)
*H04M 3/42* (2006.01)
*G08B 1/08* (2006.01)

(52) U.S. Cl.
USPC ............ 455/456.1; 455/457; 455/414.1; 340/539.15

(58) Field of Classification Search
CPC ........... G08B 21/0261; G08B 21/22; G08B 21/0288; G08B 21/0269; G08B 21/028; G08B 21/0283; G08B 21/0294; H04N 21/478; H04N 21/472
USPC ............ 340/7.58, 7.59, 8.1, 539.13, 539.14, 340/539.15, 539.17, 539.2; 348/141, 143, 348/169, 172; 379/38, 265.09; 455/404.1, 455/404.2, 414.1, 421, 456.1, 456.2, 457; 725/62, 106, 108, 115
See application file for complete search history.

(56) References Cited

U.S. PATENT DOCUMENTS

| | | | |
|---|---|---|---|
| 7,317,927 B2 * | 1/2008 | Staton et al. ............... 455/456.4 |
| 7,672,677 B2 * | 3/2010 | Howard et al. ............ 455/456.1 |
| 8,285,300 B2 * | 10/2012 | Craine et al. ............... 455/456.1 |
| 2003/0122666 A1 * | 7/2003 | John et al. ................ 340/539.13 |
| 2005/0159863 A1 | 7/2005 | Howard et al. .................. 701/37 |
| 2008/0129821 A1 * | 6/2008 | Howarter et al. ............. 348/143 |
| 2008/0242319 A1 * | 10/2008 | Paschetto et al. .......... 455/456.6 |
| 2010/0022255 A1 * | 1/2010 | Singhal ......................... 455/457 |
| 2010/0188210 A1 | 7/2010 | Howard et al. .......... 340/539.13 |
| 2010/0238024 A1 * | 9/2010 | Derrick et al. ............ 340/539.13 |
| 2011/0061080 A1 * | 3/2011 | Hill et al. ......................... 725/62 |

* cited by examiner

*Primary Examiner* — George Eng
*Assistant Examiner* — Nam Huynh
(74) *Attorney, Agent, or Firm* — Merchant & Gould P.C.

(57) ABSTRACT

Location-based person and object monitoring are provided. The location of a person or object may be monitored by associating a device with the person or object that is operative to send location information for the monitored person or object to a receiving station for establishing precise geolocation data for the monitored person or object. The geolocation information for the monitored person or object may be passed to a television services system for generating and displaying on a viewable television channel mapping information showing the location of the monitored person or object. A television channel may be designated for each monitored person or object. If the monitored person or object moves out of a prescribed monitoring range, a television channel showing the mapping information may be automatically displayed to replace a presently viewed television channel for alerting a monitoring person as to the whereabouts of the monitored person or object.

20 Claims, 4 Drawing Sheets

LOCATION-BASED PERSON AND OBJECT MONITORING

CROSS REFERENCE TO RELATED APPLICATIONS

The present application claims priority to U.S. Provisional Patent Application No. 61/427,052 filed Dec. 23, 2010, the disclosure of which is hereby incorporated by reference in its entirety.

BACKGROUND OF THE INVENTION

With the advent of modern communications systems, it has become commonplace to keep track of one's friends, associates, employees, and family members through wireless and wireline telephone systems, electronic messaging systems and location tracking systems. In the case of employees, children, or others in the charge of a supervisor, parent or guardian, various location tracking systems have been utilized for providing a location of a given person. Such systems typically allow a supervisor, parent or guardian to receive location messages for a monitored person or allow a person to log onto a location tracking system to learn of the location of a monitored person based on information from a location determining means associated with the monitored person.

There is a need for allowing a monitoring person to tune in to a dedicated television channel to see location information for a monitored person and for allowing the monitoring person to navigate the location information and for allowing the monitoring person to receive alerts when the monitored person exceeds prescribed movement restrictions.

It is with respect to these and other considerations that the present invention has been made.

SUMMARY OF THE INVENTION

The above and other problems are solved by providing location-based person and object monitoring. According to embodiments, the location of a person or object may be monitored by associating a device with the person or object that is operative to send location information for the monitored person or object to a receiving station for establishing precise geo-location data for the monitored person or object. According to embodiments, the geo-location information for the monitored person or object may be passed to a television services system for generating and displaying on a viewable television channel mapping information showing the location of the monitored person or object. The generated and displayed map may be displayed on a prescribed television channel for allowing a monitoring person, for example, a supervisor, parent or guardian to review the location of the monitored person or object by tuning to the prescribed display channel. According to one embodiment, a specific display channel may be designated for each monitored person or object, or a single display screen may be divided into display sections for showing location information for multiple persons and/or objects simultaneously.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

Embodiments of the present invention are directed to location-based person and object monitoring. According to embodiments, the location of a person or object may be monitored by associating a device with the person or object that is operative to send location information for the monitored person or object to a receiving station for establishing precise geo-location data for the monitored person or object. The geo-location information for the monitored person or object may be passed to a television services system on a periodic basis through either a push or pull means for use by the television services system for generating and displaying on a viewable television channel mapping information showing the location of the monitored person or object.

According to embodiments, the geo-location information for the monitored person or object is utilized by a mapping application associated with a television services provisioning computing device, for example, a television set top box, for generating and displaying a map showing location information for the monitored person or object. The generated and displayed map may be displayed on a prescribed television channel for allowing a monitoring person, for example, a supervisor, parent or guardian to review the location of the monitored person or object by tuning to the prescribed display channel.

According to one embodiment, a specific display channel may be designated for each monitored person or object, or a single display screen may be divided into display sections for showing location information for multiple persons and/or objects simultaneously. For example, a parent with two children may receive location information for each child via a wireless telephone operated by each child. Location information from the wireless telephones operated by each child may be passed to a receiving station associated with the wireless telephone service provider through which the wireless telephones are operated. Location information may be pushed or pulled to the television services system for use in association with a mapping application. A viewing channel may be designated for each of the monitored children and a map may be generated showing the location of each child relative to other geographic features. For example, channel 500 may be designated for a first child and channel 501 may be designated for a second child. Accordingly, the parent or guardian of the example monitored children may periodically tune in to the designated channel for each child to review the child's current location relative to other geographic features, for example, streets, rivers, streams, buildings, and the like. As should be appreciated, such location information may be received for any number of persons or objects for monitoring the location of the persons or objects, as desired.

Figure 1:
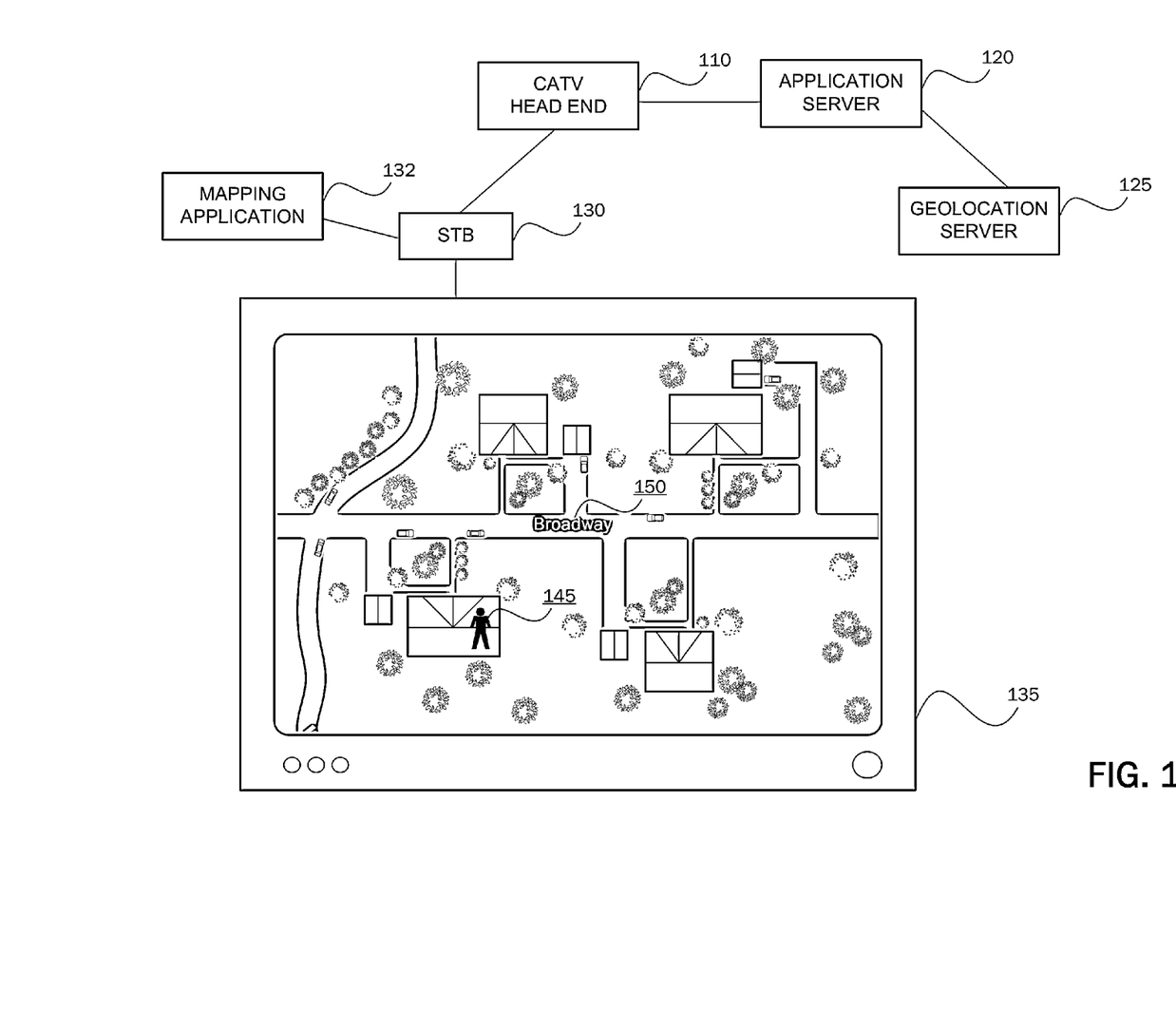
FIG. 1 illustrates a system architecture with which embodiments of the present invention may be practiced.

FIG. 1 illustrates a system architecture with which embodiments of the present invention may be practiced. As briefly described above, according to embodiments of the present invention, location information for a monitored person or object may be integrated with a computer-generated map which may be displayed on a dedicated television viewing channel for use by a supervisor, parent or guardian responsible for monitoring the whereabouts of the monitored person or object. As illustrated in FIG. 1, a television services system head end 110 is operative to receive location information for a monitored person or object from a location tracking system, described below. As will be described below with respect to FIG. 3, the television services system head end 110 is operative for providing television viewing content to a television 135 via a set top box 130 for viewing by a person responsible for monitoring the whereabouts of a monitored person or object.

An application server 120 (described below with respect to FIG. 3) is operative for providing a variety of software functionality from the cable services head end 110 to the television 135 via the set top box 130. According to embodiments of the present invention, a geo-location server 125 is a general purpose computing device or software application system operative for receiving and storing geo-location information for a monitored person or object on a periodic basis for use by a mapping application 132, as described below. As will be described below, geo-location information for a monitored person or object may be received via a variety of suitable means and may be stored at the geo-location server after it is received by the cable services system via the television services system head end 110 and application server 120.

Referring still to FIG. 1, a set top box 130 is a general purpose computing system, described in detail below with respect to FIG. 3 for providing viewing content and software application functionality to the television set 135. According to embodiments of the present invention, a mapping application 132 is associated with the set top box 130 for generating a displayable map showing the location of a monitored person or object where the generated map may be displayed on a dedicated television viewing channel for review by a monitoring person. According to embodiments, the mapping application 132 may be in the form of any suitable mapping application for generating a map showing a variety of geographic features and for showing the placement of a particular monitored person or object on the generated map. As should be appreciated, the mapping application 132 may be operated at the set top box 130, at the application server 120, or at a remote location accessible by the set top box or application server 120 via any suitable information transport means, for example, via an Internet protocol data transport means.

As should be appreciated, the content of a generated map may vary greatly from a very elaborate map showing great detail of geographic features, for example, vegetation, streets, rivers, streams and the like to a very basic mapping display that shows only the geo-location data for the monitored person or object. That is, on the one hand, an elaborate map may be generated and displayed showing the precise location of the monitored person or object with respect to precise geographic features such as houses, streets, rivers, trees, and the like, or the map may simply show the geo-location coordinates, for example, latitude and longitude coordinates of the monitored person or object.

In the case of a map showing the location of the monitored person or object with respect to geographic features, various navigation functions may be provided by the mapping application 132 and the set top box 130 for use by a person monitoring the location of the monitored person or object. For example, zoom functionality may be provided for allowing a monitoring person to zoom out from the monitored person or object to see a wider mapping range, or navigation functionality may be provided for allowing the monitoring person to zoom in on the monitored person or object to see more detail as to the precise location of the monitored person or object. Similarly, navigation functions may be provided for allowing the monitoring person to move the map in various directions to determine those geographic features in the proximity of the monitored person or object. According to embodiments, other functions may be provided for customizing other monitoring settings including, but not limited to, alert thresholds, time-of-day alerts, travel restriction information, and the like.

As described above, according to embodiments, specific channels may be designated for each of various monitored persons or objects. For example, a parent or guardian may designate a first channel for monitoring the whereabouts of a first child, a second channel for monitoring the whereabouts of a second child, a third channel for monitoring the whereabouts of a vehicle, and a fourth channel for monitoring the whereabouts of an elderly relative, and so on. Thus, by tuning into the designated television viewing channels via the set top box 130, the parent or guardian may receive on her television 135 a generated map showing the location of each of the monitored persons or objects relative to other geographic features, as illustrated in FIG. 1. For example, the monitored person 145 is illustrated in a map displayed on the television 135 in proximity to a house located on a street 150. By reviewing the map displayed on the television set 135, as illustrated in FIG. 1, the parent or guardian may receive a quick and reliable indication of the location of the monitored person or object. As described above, according to an alternative embodiment, a single display screen may be divided into multiple display areas, each of which may be used to display a map for a different displayed person or object.

According to another embodiment, if a monitoring person is viewing a channel that is not designated as a specific channel for monitoring a person or object, and if location information of the monitored person or object meets a prescribed condition (e.g., person or object has moved outside of a restricted travel range), an alert may be provided via an overlay on the channel currently being viewed by the monitoring person. For example, an overlay may be a map or a message displayed or scrolled across a portion of the viewable television screen.

As illustrated in FIG. 1, embodiments of the present invention are described with reference to a television services system head end 110 and associated servers and software applications. As should be appreciated, the illustration of a cable services system head end 110 and associated computers and software applications is for purposes of example only and are not limiting of other means for providing the monitoring information on a viewable television screen as described herein. For example, the geo-location information required by the mapping application 132 may be received via an Internet-based computing architecture operative for displaying viewable information on a designated channel on a television set 135.

Figure 2A:
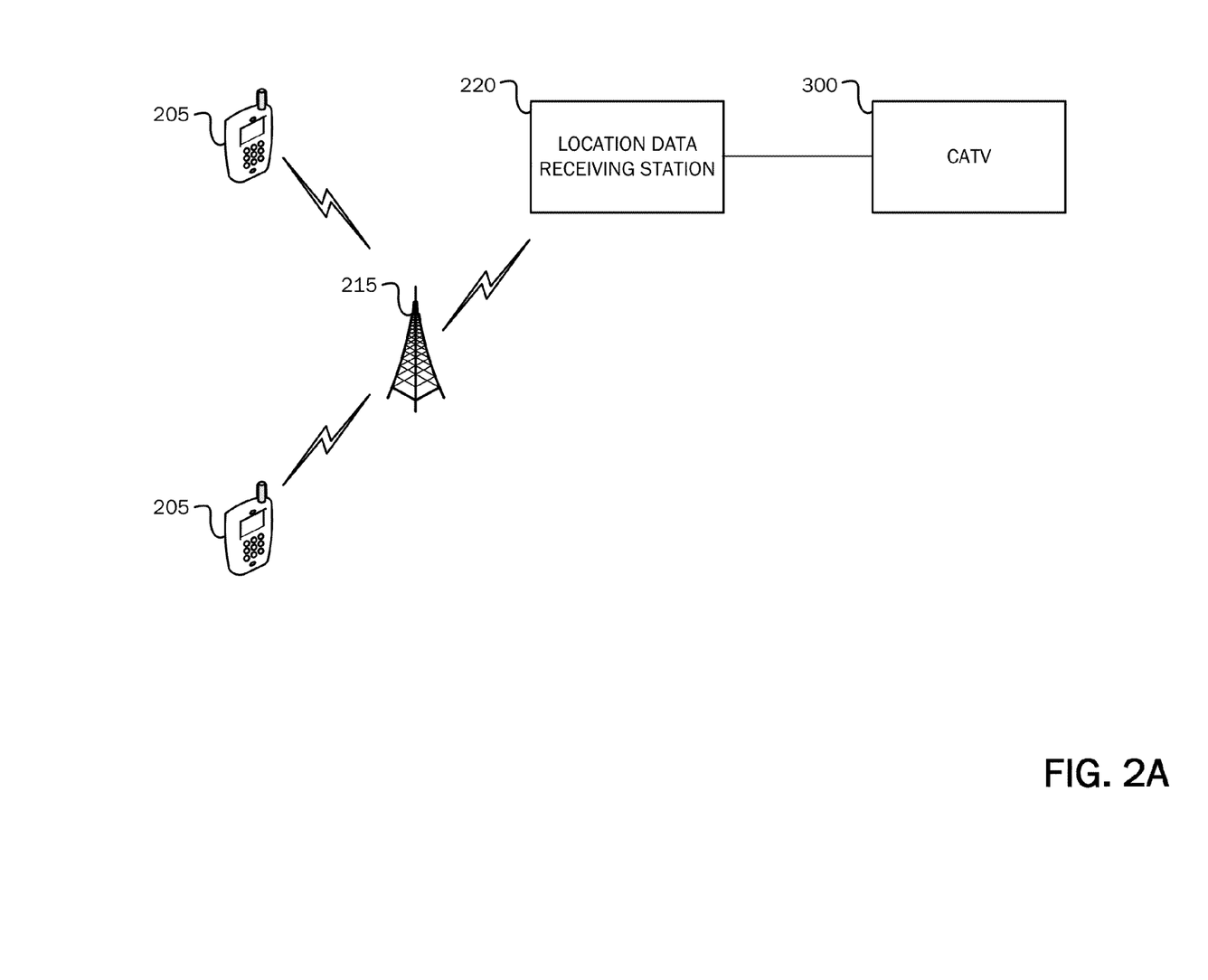
FIG. 2A illustrates a system architecture for passing location information from a wireless device to a television services system via a receiving system according to embodiments in the present invention.

FIG. 2A illustrates a system architecture for passing location information from a wireless device to a television services system via a receiving system according to embodiments in the present invention. Referring now to FIG. 2A, one architecture for receiving geo-location information for a monitored person or object is illustrated. According to the architecture illustrated in FIG. 2A, wireless devices 205 are illustrative of a mobile wireless communications device, for example, a wireless telephone, wireless pager, wireless computing device, personal digital assistant and the like that may be utilized for determining location information for a person or object associated with the wireless devices 205. The antenna 215 is illustrative of a wireless network through which location information may be passed from the wireless devices 205 to a receiving station 220.

In the case of a wireless telephone network, the wireless devices 205 may be in the form of wireless telephones operative for receiving location information for the wireless devices 205 and for passing the information through a wireless network 215 to a receiving station 220 in the form of a mobile telephone switching office that is operative for providing wireless communications services via the wireless devices 205. As should be appreciated, the receiving station 220 may be in the form of various other devices or systems operative for receiving location information from the wireless devices 205 for ultimately passing to the television cable services system 300 and to the cable services system head end 110 illustrated and described with reference to FIG. 1 above. And, as described above with respect to FIG. 1, the use of a cable services system 300 for receiving location information for a monitored person or object is but one example of a system that may be utilized for receiving location information and for passing the information to a mapping application 132 for generating a map showing the whereabouts of a monitored person or object and for displaying the generated map on a viewable television channel for review by a monitoring person, as described herein.

Referring still to FIG. 1, the wireless devices 205 may be in the form of any wireless device operative for passing presence information to the receiving station 220 through a presence detection means. For example, a wireless device 205 in the form of a wireless telephone, personal digital assistant (PDA), or wireless handheld computer, and the like may detect the presence of a wireless fidelity (WIFI) transmitter/receiver for purposes of connecting with a WIFI hotspot for sending and receiving wireless signaling from the wireless device. According to embodiments of the present invention, when the wireless device detects a WIFI signal transmitted via a WIFI transmitter/receiver, physical presence information associated with the wireless device may be passed through an associated the wireless network 215 to a location information server at the receiving station 220 and may be stored for the monitored person or object to which the device 205 is associated. Alternatively, physical presence information associated with the wireless device may be transmitted via an appropriate network to a target device contained in or operated in association with the receiving station 220.

Alternatively, a wireless presence detector in the form of a non-WIFI wireless sensor may detect the presence of the wireless device 205 being carried by the monitored person or object, and may likewise pass presence information through the wireless network 215 to the receiving station 220. A variety of other wireless presence detection means, for example, BLUETOOTH, infrared (IR), and the like may be equally utilized. In addition, as described above, such information may be passed to the receiving station 220, or such information may be passed directly from a monitored person/object-associated device, such as a carried mobile telephone, to a device or system requiring the information, for example, the geo-location server 125.

Alternatively, one or more wireless-based positioning technologies (e.g., range detection, triangulation, trilateration, multilateration, observed time difference, time difference of arrival, angle of arrival, etc.) may be employed by the wireless network 215 for determining a location of a wireless device 205 and associated monitored person or object. For example, range detection may be employed by the wireless network 215, wherein a range from the monitored person/object and associated device 205 may be determined based on signal strength from the wireless device to a wireless transmission point (e.g., wireless transmission tower) for determining the location of the monitored person/object and associated device 205. Presence information determined for the monitored person/object via range detection may be passed through the wireless network 215 to the receiving station 220.

Alternatively, a satellite-based geo-location receiver (e.g., GPS receiver) operated in the wireless device 205 may be utilized for determining global positioning satellite coordinates for the monitored person or object. Such GPS coordinates may be transmitted through the wireless network 215 to the receiving station 220 on a periodic basis on a push or pull basis.

As described above with respect to FIG. 1, the location information obtained through one of these many location means via the wireless devices 205 and passed to a receiving station 220 may be passed to a system operative for generating a map for showing a geographic location of a monitored person or object to which the wireless device 205 is associated. According to embodiments described herein, the information may be passed to a cable services system 300 through a wireless or wireline transport means including Internet protocol transports through Internet connections between the receiving station 220 and the cable services system 300 (described in detail below with respect to FIG. 3). Alternatively, the geographic location information obtained through one of the systems described above may be passed to any other suitable computing system operative for providing mapping information showing the location of a monitored person or object onto a viewable television screen for review by a monitoring person, as described herein.

Figure 2B:
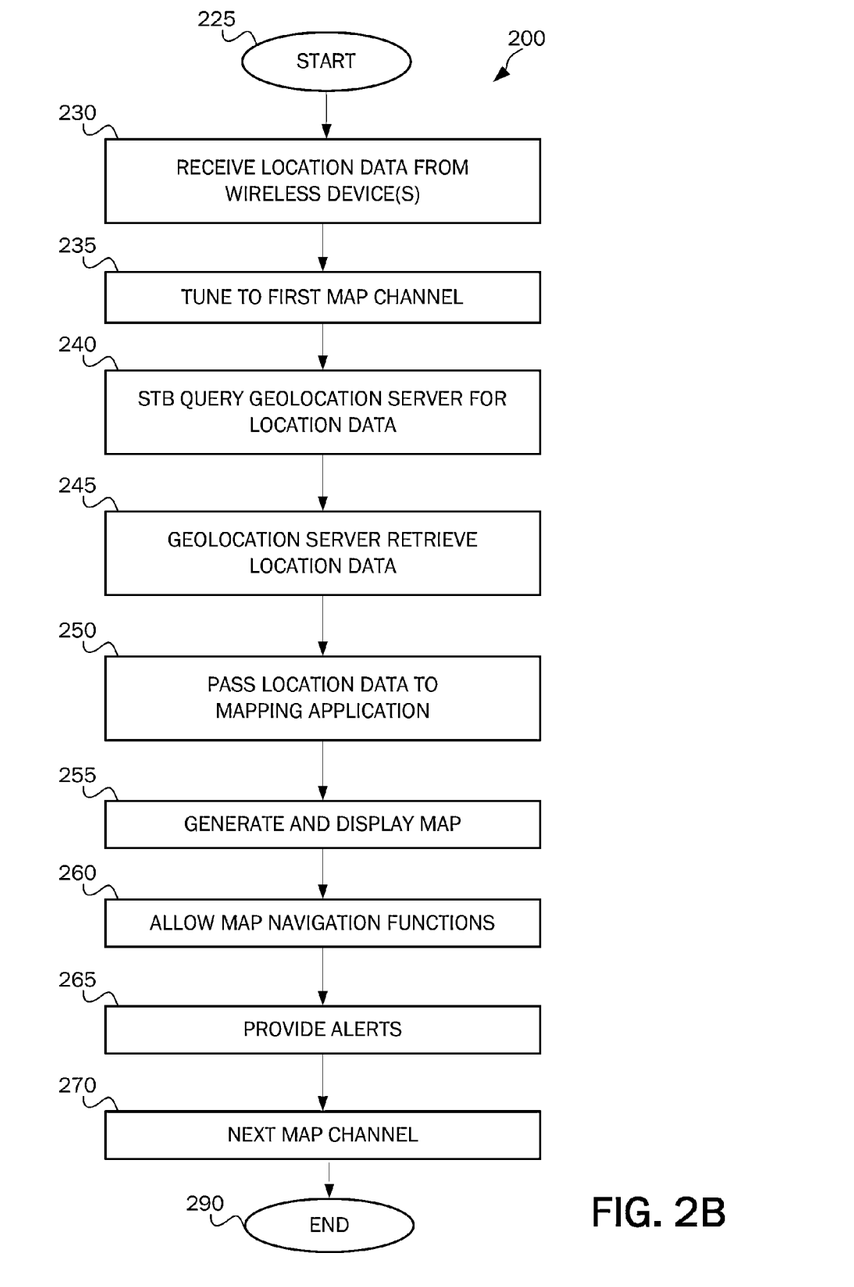
FIG. 2B is a flow diagram illustrating a routine for monitoring a person or object based on location information for the monitored person or object.

Having described a system architecture in which embodiments of the present invention may be practiced with respect to FIGS. 1 and 2, FIG. 2B is a flow diagram illustrating a routine for monitoring a person or object based on location information for the monitored person or object. The routine 200 begins at start operation 225 and proceeds to operation 230 where location data is received from the wireless devices 205 in association with a monitored person or object. For example, the wireless devices 205 may be in the form of a wireless telephone operated by a child being monitored by a parent or guardian. At operation 235, a parent, guardian, supervisor or other monitoring person may tune to a first map channel associated with a first person or object for which monitoring is required. For example, a channel 500 provided via a parent's cable services system 300 may be designated for allowing the parent to monitor a child 145 by viewing the child's whereabouts on a displayed map on the parent's television 135, as illustrated above in FIG. 1.

At operation 240, the set top box 130 queries the geo-location server 125 for location data associated with the monitored person. For example, after the parent tunes to the channel associated with a particular monitored person, for example, a designated child, the set top box 130 may query the geo-location server 125 for location information for the monitored child. For example, latitude and longitude coordinates for the monitored child and a date/time stamp associated with latitude and longitude coordinates for the location information associated with the child may be received from the geo-location server.

At operation 245, the geo-location server retrieves the location data for the designated monitored person, for example, the monitored child via the application server 120, the cable services system head end 110, and ultimately from the receiving station 220 operative for receiving location data from the wireless devices 205, as described above. As should be appreciated, the geo-location information may be retrieved by the set top box each time the monitoring person tunes to the designated mapping channel followed by a retrieval of the information from the geo-location server in real time, as described above. That is, the location information for the monitored person or object may be obtained in real time each time the monitoring person tunes to the appropriate mapping channel. Alternatively, location information for the monitored person or object may be pushed to the geo-location server or pulled to the geo-location server on a periodic basis, for example, every 30 seconds, and the data may be stored for use when the monitoring person selects a desired monitoring channel.

Referring still to FIG. 2B, at operation 250, the location data retrieved from the geo-location server 125 is passed to the mapping application 132 operated in association with the set top box 130. At operation 255, the mapping application 132 generates a map showing the location of the monitored person or object. As described above, the map generated by the mapping application 132 may be an elaborate map showing a variety of geographic features, for example, buildings, streets, rivers, streams, trees, land topography, and the like in association with a location of the monitored person or object with respect to the mapped geographic features. On the other hand, a simple display of geographic location data, for example, a date/time stamp in association with geographic coordinates data, for example, latitude and longitude may be displayed for the monitored person or object.

At operation 260, map navigation functions may be provided to the monitoring person for zooming in or zooming out on the monitored person or object or for moving the map in various directions for allowing the monitoring person to view geographic information and features in other locations relative to the monitored person or object. For example, a monitoring person may wish to move a displayed map to the east to determine what geographic features are located to the east of a monitored person or object. For example, a parent may wish to move a displayed map for determining the relative location of a child's school to the current location of the child in reference to the school.

At operation 265, one or more alerts may be provided to the monitoring person relative to the present whereabouts of the monitored person or object. According to embodiments, a monitoring person may be provided via an interface, for example, a web interface via a web services platform, such as the web services system 127 illustrated in FIG. 3, to allow the monitoring person to enter travel restrictions in association with a monitored person or object. For example, a parent may enter a range beyond which a monitored child may not travel. For example, a parent may enter a range of 100 yards from the location of the parent's home out of which a monitored child may not travel. According to embodiments, the entered travel restriction information may be passed to the mapping application 132, and a graphical feature associated with the travel restriction may be displayed on the map relative to the monitored person or object.

If the monitored person or object travels outside the restricted travel range, one or more alert mechanisms may be utilized for notifying the monitoring person that the monitored person or object has traveled outside the restricted travel range. For example, an audible alarm may be passed to the monitoring person via the television set, a message may be passed to the monitoring person via a telecommunications device, for example, a wireless or wireline telephone, and the like. As described above, according to one embodiment, an alert may be provided via an overlay on a channel being viewed that is not designated as a specific channel for monitoring a person or object upon receiving an indication of a location of a monitored person or object meeting a prescribed condition (e.g., person or object moving outside of a restricted travel range). For example, an overlay may be a map or a message displayed or scrolled across a portion of the viewable television screen.

According to embodiments of the present invention, if the monitoring person is viewing a given television channel, and the monitored person or object moves outside the restricted travel range, the viewing channel associated with the map for the monitored person or object may be automatically displayed to the monitoring person showing an updated map or mapping information for the monitored person or object and showing that the person or object has moved outside the restricted travel range. As should be appreciated, restrictions may be placed on a monitored person or object according to a variety of parameters including travel range, travel speed, travel altitude (for example, where a child climbs a tree or travels to an unauthorized floor in a building, etc.), and the like. Various options may be provided via the television set for allowing the monitoring person to contact the monitored person if the monitored person has moved outside the restricted travel range. For example, if a monitored child has moved outside of a certain travel range (e.g., outside of a neighborhood), upon receiving an indication of the child traveling outside the neighborhood, an option may be provided for automatically establishing a call between the monitoring parent and the monitored child, automatically sending an SMS message, etc. or via a selection of a control on a remote control device.

At operation 270, if the monitoring person switches to a different viewing channel associated with a different monitored person or object, the operations illustrated and described with respect to the routine 200 are repeated for the next monitored person or object. The routine ends at operation 290.

As described above with reference to FIGS. 1-2B, one network with which embodiments of the invention may be practiced includes a cable television/data/telephone network. FIG. 3 is a simplified block diagram illustrating a cable services system (hereafter referred to as "CATV") architecture that may serves as an exemplary operating environment for embodiments of the present invention.

Figure 3:
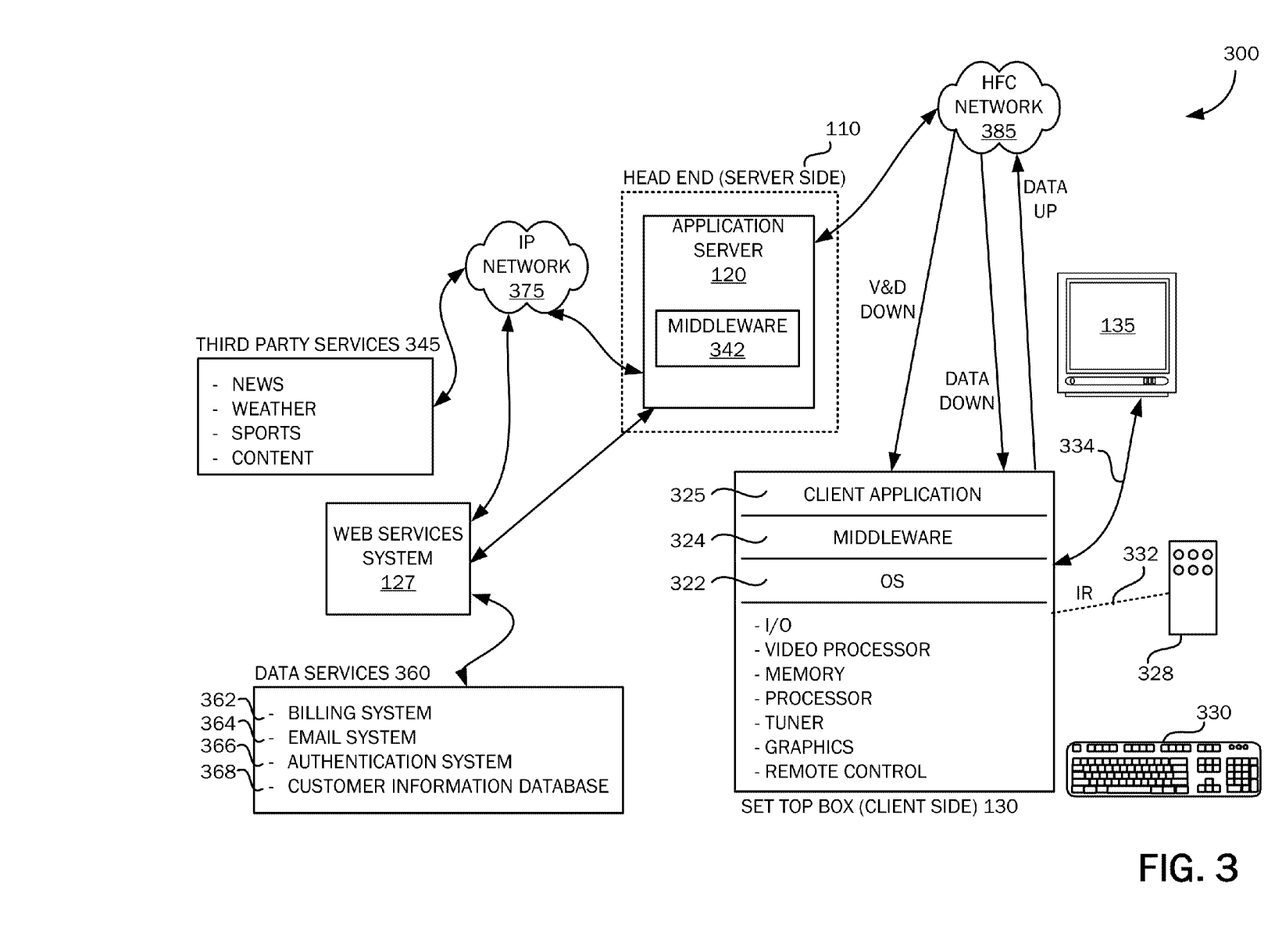
FIG. 3 illustrates a system architecture of a television services system with which embodiments of the present invention may be practiced.

Referring now to FIG. 3, digital and analog video programming, information content and interactive television services are provided via a hybrid fiber coax (HFC) network 385 to a television set 135 for consumption by a television/services system customer. The functionality of the HFC network 385 allows for efficient bidirectional data flow between the client-side set-top box 130 and the server-side application server 120 of the present invention. Embodiments of the present invention are not limited to an HFC network 385, but may include other transport mediums included, but not limited to, an all fiber system, an all coax system, and an IP Ethernet-based system. According to embodiments of the present invention, the CATV system 300 is in the form of a distributed client-server computing system for providing video and data flow across the HFC network 385 between server-side services providers (e.g., television/services providers) via a server-side head end 110 and a client-side customer via a client-side set-top box (STB) functionally connected to a customer receiving device, such as the television set 135.

On the client side of the CATV system 300, digital and analog video programming and digital and analog data are provided to the customer television set 135 via the set-top box (STB) 130. Interactive television services that allow a customer to input data to the CATV system 300 likewise are provided by the STB 130. As illustrated in FIG. 3, the STB 130 is a multipurpose computing device having a computer processor, memory and an input/output mechanism. The input/output mechanism receives input from server-side processes via the HFC network 385 and from customers via input devices such as the remote control device 328 and the keyboard 330.

Because a variety of different operating systems 322 may be utilized by a variety of different brands and types of set-top boxes, a middleware layer 324 is provided to allow a given software application to be executed by a variety of different operating systems. According to an embodiment of the present invention, the middleware layer 324 may include a set of application programming interfaces (API) that are exposed to client applications 325 and operating systems 322 that allow the client applications to communicate with the operating systems through common data calls understood via the API set. Referring still to FIG. 3, the head end 110 of the CATV system 300 is positioned on the server side of the CATV system and includes hardware and software systems responsible for originating and managing content for distributing through the HFC network 385 to client-side STBs 130 for presentation to customers via televisions 135. As described above, a number of services may be provided by the CATV system 300, including digital and analog video programming, interactive television services, telephone services, video-on-demand services, targeted advertising, and provision of information content.

The application server 120 is a general-purpose computing system operative to assemble and manage data sent to and received from the client-side set-top box 130 via the HFC network 385. As described above with reference to the set-top box 130, the application server 120 includes a middleware layer 342 for processing and preparing data from the head end of the CATV system 300 for receipt and use by the client-side set-top box 130. For example, the application server 120 via the middleware layer 342 may obtain data from third-party services 345 via the Internet 375 for transmitting to a customer through the HFC network 385 and the set-top box 130. For example, a weather report from a third-party weather service may be downloaded by the application server via the Internet 375. When the application server 120 receives the downloaded weather report, the middleware layer 342 may be utilized to format the weather report for receipt and use by the set-top box 130. According to one embodiment of the present invention, data obtained and managed by the middleware layer 342 of the application server 120 is formatted according to the Extensible Markup Language and is passed to the set-top box 130 through the HFC network 385 where the XML-formatted data may be utilized by a client application 325 in concert with the middleware layer 324, as described above. As should be appreciated by those skilled in the art, a variety of third-party services data, including news data, weather data, sports data and other information content may be obtained by the application server 120 via distributed computing environments such as the Internet 375 for provision to customers via the HFC network 385 and the set-top box 130.

According to embodiments of the present invention, the application server 120 obtains customer profile data from services provider data services 360 for preparing a customer profile that may be utilized by the set-top box 130 for tailoring certain content provided to the customer. According to an embodiment of the present invention, a customer profile may include communications applications provisioned on networked STBs, as well as, designations of individual STBs in a home, business or facility (e.g., "kitchen STB," "bedroom STB," "office STB," and the like).

As illustrated in FIG. 3, the services provider data services 360 include a number of services operated by the services provider of the CATV system 300 which may include data on a given customer. For example, a billing system 362 may include information such as a customer's name, street address, business identification number, Social Security number, credit history, and information regarding services and products subscribed to by the customer. An electronic mail system 364 may contain information such as electronic mail addresses, high-speed Internet access subscription information and electronic mail usage data. An authentication system 366 may include information such as secure user names and passwords utilized by customers for access to network services. The customer information database 368 may include general information about customers such as place of employment, business address, business telephone number and demographic information such as age, gender, educational level, and the like. As should be understood by those skilled in the art, the disparate data services systems 362, 364, 366, 368 are illustrated as a collection of data services for purposes of example only. The example data services systems comprising the data services 360 may operate as separate data services systems, which communicate with a web services system (described below) along a number of different communication paths and according to a number of different communication protocols.

Although described herein with respect to setup changes to various electronic devices via server side and or client side applications, in alternative embodiments, the invention may be used in combination with any number of computer systems, such as in desktop environments, laptop or notebook computer systems, multiprocessor systems, micro-processor based or programmable consumer electronics, network PCs, mini computers, main frame computers and the like. Embodiments of the present invention may be utilized in various distributed computing environments where tasks are performed by remote processing devices that are linked through a communications network in a distributed computing environment.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of location-based object monitoring, comprising:
    receiving location data for a first monitored object;
    receiving an indication that the first monitored object has moved to a location outside a prescribed monitoring range;
    generating an electronic map showing the location of the first monitored object on the electronic map;
    in response to receiving the indication that the first monitored object has moved to the location outside the prescribed monitoring range, tuning to a television channel designated for monitoring the first monitored object to display the electronic map showing the location of the first monitored object; and
    automatically initiating a communication between a monitoring party and the monitored party across a cable services system and via a mobile wireless communications device associated with the monitored party.

2. The method of claim 1, further comprising switching to a second television channel designated for monitoring a second monitored object, and automatically displaying a second electronic map on the television display surface showing the location of the second monitored object via the second television channel designated for the second monitored object.

3. The method of claim 2, further comprising dividing the television display surface into a plurality of display sections, and displaying a first electronic map showing the location of the first monitored object in a first display section and displaying the second electronic map showing the location of the second monitored object in a second display section of the divided television display surface.

4. The method of claim 1, further comprising allowing navigation of the displayed electronic map via one or more navigation functions.

5. The method of claim 1, wherein automatically switching to the television channel designated for monitoring the first monitored object includes automatically switching to the television channel designated for monitoring the first monitored object via a set top box operatively associated with the television channel and operative to cause a display of the electronic map via the television channel.

6. The method of claim 1, wherein receiving the location data for the first monitored object includes receiving the location data via a wireless device associated with the first monitored object.

7. The method of claim 6, wherein receiving the location data via the wireless device associated with the first monitored object includes receiving the location data via the wireless device operative to receive and transmit the location data.

8. The method of claim 1, wherein receiving the location data for the first monitored object includes receiving the location data for a first monitored person.

9. The method of claim 1, wherein receiving the location data for the first monitored object includes receiving the location data for a first monitored animal.

10. The method of claim 1, wherein receiving the location data for the first monitored object includes receiving the location data for a first monitored vehicle.

11. A method of location-based object monitoring; comprising:
    displaying one or more content items on a television display surface via a first television channel;
    receiving location data for a first monitored object;
    receiving an indication that the first monitored object has moved to a location outside a first prescribed monitoring range;
    generating an electronic map showing the location of the first monitored object on the electronic map;
    in response to receiving the indication that the first monitored object has moved to the location outside the first prescribed monitoring range, tuning to a second television channel designated for monitoring the first monitored object to display the electronic map showing the location of the first monitored object; and
    automatically initiating a communication between a monitoring party and the monitored party via a cable services system and a mobile wireless communications device associated with the monitored party.

12. The method of claim 11, wherein in response to receiving the indication that a second monitored object has moved to the location outside a prescribed monitoring range, automatically switching from the second television channel to a third television channel designated for monitoring the second monitored object; and automatically displaying a second electronic map on the television display surface showing the location of the second monitored object via the third television channel designated for the second monitored object.

13. The method of claim 12, further comprising dividing the television display surface into a plurality of display sections, and displaying a first electronic map showing the location of the first monitored object in a first display section and displaying the second electronic map showing the location of the second monitored object in a second display section of the divided television display surface.

14. The method of claim 11, further comprising allowing navigation of the displayed electronic map via one or more navigation functions.

15. The method of claim 11, wherein receiving the location data for the first monitored object includes receiving the location data via a wireless device associated with the first monitored object.

16. The method of claim 15, wherein receiving the location data via the wireless device associated with the first monitored object includes receiving the location data via the wireless device operative to receive and transmit the location data.

17. The method of claim 11, wherein receiving the location data for the first monitored object includes receiving the location data for a first monitored person.

18. The method of claim 11, wherein receiving the location data for the first monitored object includes receiving the location data for a first monitored animal.

19. The method of claim 11, wherein receiving the location data for the first monitored object includes receiving the location data for a first monitored vehicle.

20. A system for location-based object monitoring; comprising:
    a television set top box operative to:
        receive location data for a first monitored object from a location determining system;
        receive an indication that the first monitored object has moved to a location outside a prescribed monitoring range by comparing a present location of the first monitored object with the location associated with the prescribed monitoring range;

generate an electronic map showing the location of the first monitored object on the electronic map;

in response to receiving the indication that the first monitored object has moved to the location outside the prescribed monitoring range, tune to a television channel designated for monitoring the first monitored object to display the electronic map showing the location of the first monitored object;

automatically initiate a communication between a monitoring party and the monitored party via a cable services system and a mobile wireless communications device associated with the monitored party.

\* \* \* \* \*